N. ALLSTATTER.
Harvester.
No. 95,301.
5 Sheets—Sheet 1.
Patented Sept. 28, 1869.
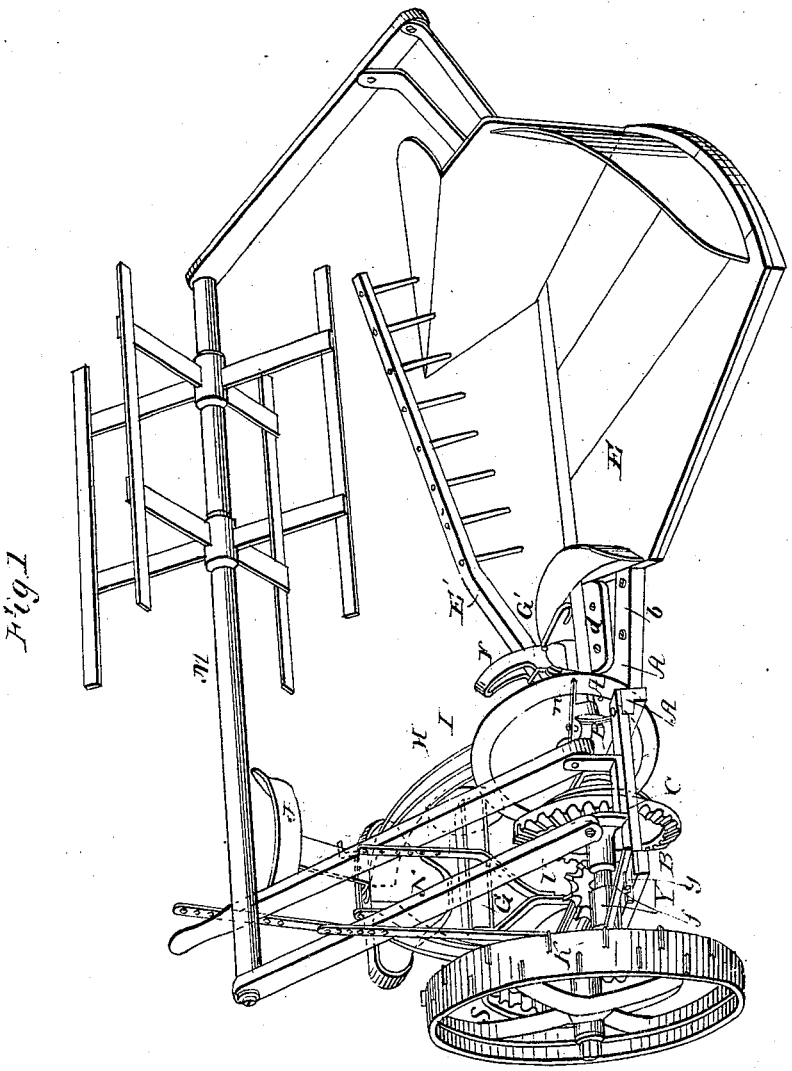
Witnesses
J. M. Beale,
Wm. F. Browne
Inventor
Nicholas Allstatter.
By his atty R. D. O. Smith

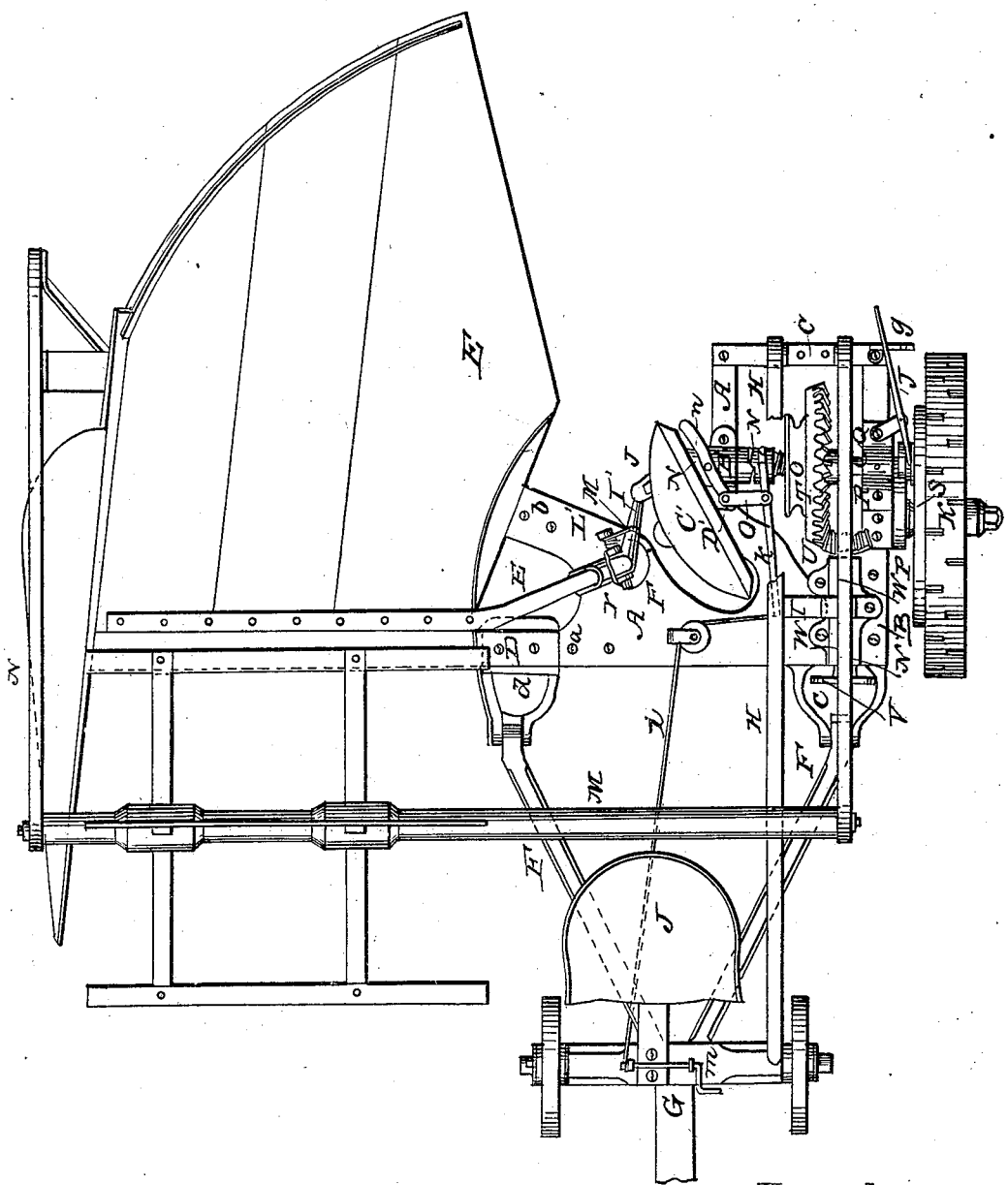

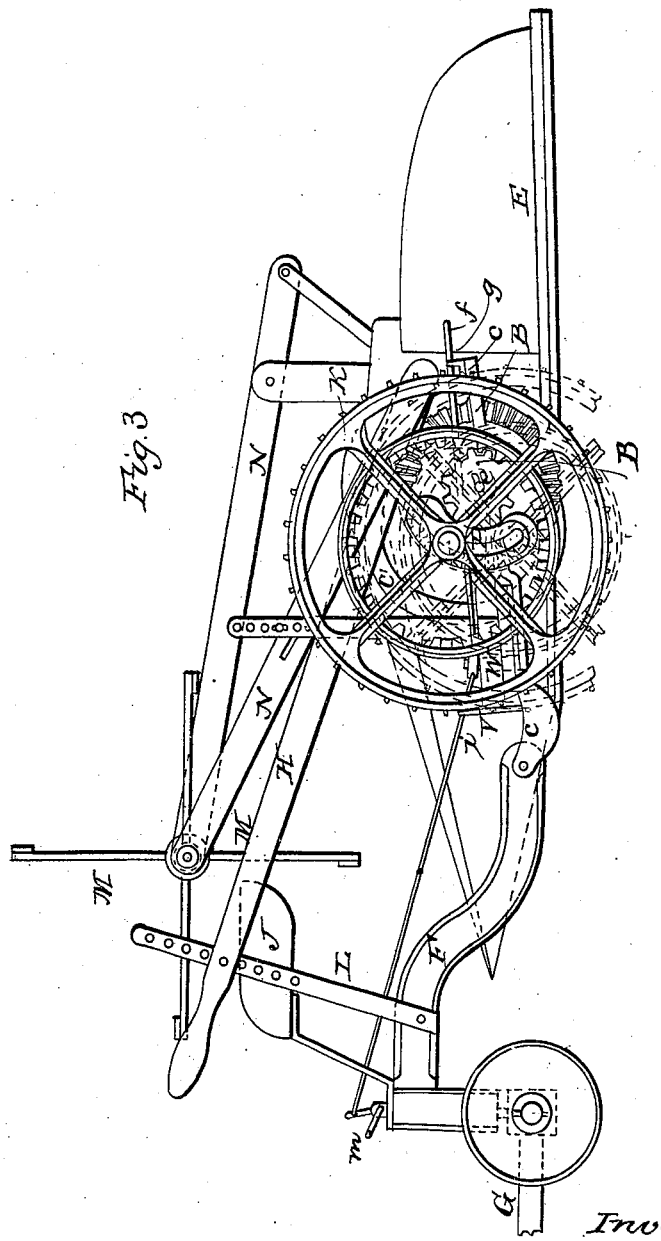

N. ALLSTATTER.
Harvester.
No. 95,301.
5 Sheets—Sheet 4.
Patented Sept. 28, 1869.
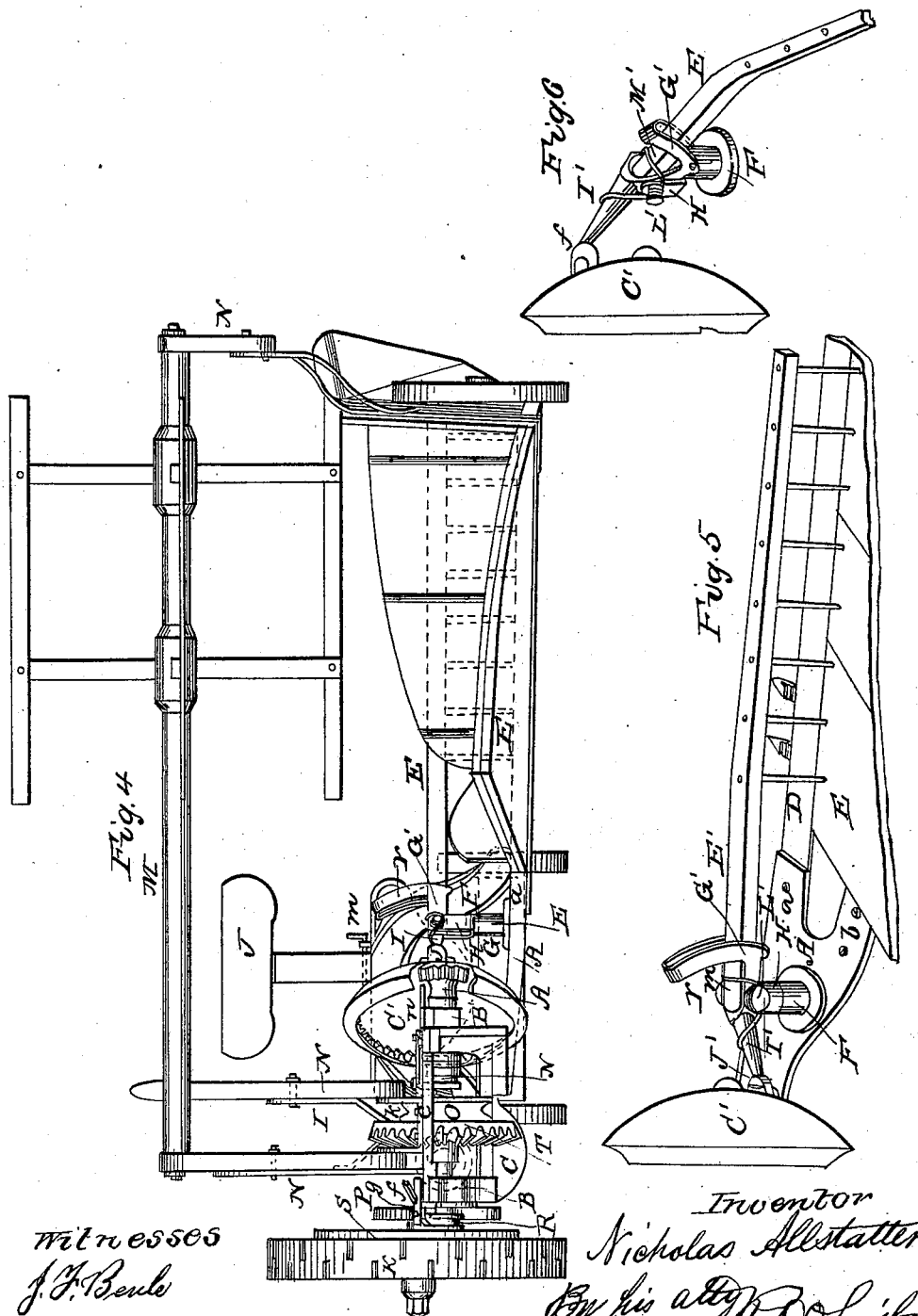

N. ALLSTATTER.
Harvester.
No. 95,301.
5 Sheets—Sheet 5.
Patented Sept. 28, 1869.
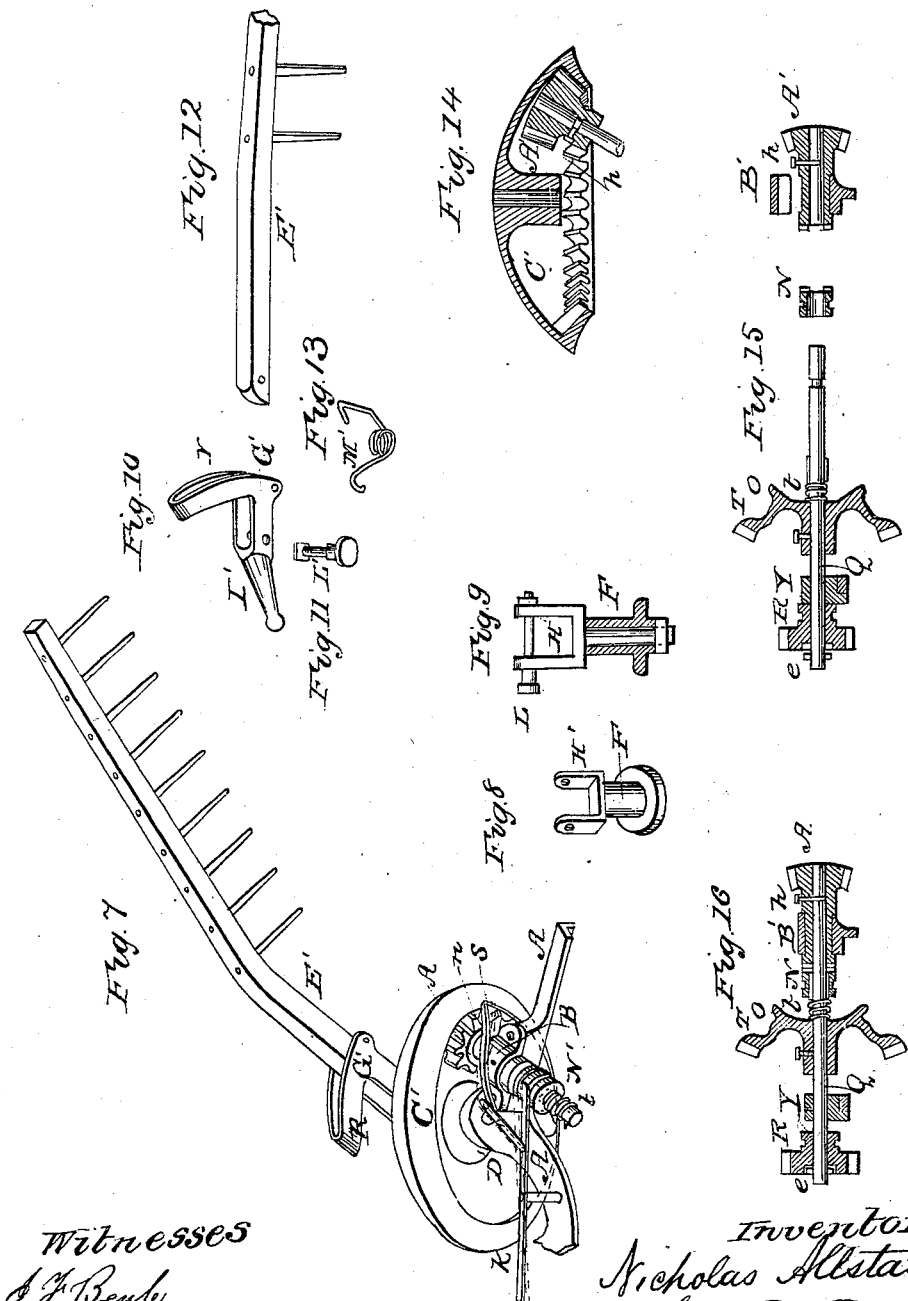

UNITED STATES PATENT OFFICE.

NICHOLAS ALLSTATTER, OF HAMILTON, OHIO.

IMPROVEMENT IN HARVESTERS.

Specification forming part of Letters Patent No. 95,301, dated September 28, 1869.

*To all whom it may concern:*

Be it known that I, NICHOLAS ALLSTATTER, of Hamilton, in the county of Butler and State of Ohio, have invented a new and useful Improvement in Harvesters; and I do hereby declare the following to be a full, clear, and exact description of the same, reference being had to the accompanying drawings, in which—

Figure 1 is a perspective view taken from the rear. Fig. 2 is a plan of the same. Fig. 3 is a side elevation. Fig. 4 is a rear elevation. Fig. 5 is a perspective view of the rake and attachments. Figs. 6 and 7 represent the rake and attachments in different positions. Figs. 8, 9, 10, 11, 12, and 13 represent details of rake and attachments detached. Fig. 14 is a sectional view of the driving-pinions for the rake. Fig. 15 represents, in section, the attachments of the main pinion-shaft detached. Fig. 16 represents, in section, the attachments of the main pinion-shaft in position.

This invention relates, first, to devices for regulating the operation of an automatic sweep-rake, so that the same can only be thrown out of gear at a certain point of its revolution; second, to the arrangement of clutch devices by which the rake may be thrown in and out of gear; third, to construction of the rake-pinion whereby a single journal-box serves for both pinion shaft and bearing; fourth, to the rake's driving-wheel; fifth, to the construction and arrangement of the rake-arm and attachments.

That others may understand the construction and operation of my invention, I will particularly describe it.

The main frame of my machine, as shown in the drawings hereto attached, consists of the cast-iron bed-plate A and the wrought side and end bars B C. The plate A is provided with diverging branches *a b* at its outer end, to the former of which is bolted the finger-bar D, and to the latter a transverse sill or brace of the platform E, said platform being also secured at its front edge to the finger-bar D in the usual way. In front of the line of the finger-bar are two projections, *c d*, the former being cast with the plate A and the latter being a part of the inner shoe. The projection *c* serves as a guard to the cutter's crank, and at the forward end of each of said projections there is a joint by which the main frame is connected to the leading frame F, supported at its front end upon the truck G, to which the draft-power is applied.

The driver's seat J is mounted upon the front end of the leading frame F, and a lever, H, jointed to the rear bar C, and resting upon the fulcrum I, passes thence forward to a point convenient to the driver's hand while he is seated upon the seat J, and by means of this lever the elevation of the front edge of the cutting apparatus is regulated, as, when the attendant elevates the front end of said lever, the cutting apparatus will also be elevated, and a movement of the lever in the opposite direction will influence the cutting apparatus correspondingly. During such movements of the cutting apparatus the main frame will move upon the axis of the main driving-wheel K as a center of motion, and the angle of the leading frame F to the main frame will be altered.

In order to fix the cutting apparatus at any desired point of elevation to secure the proper inclination of the cutters in respect to the ground, the standard L is erected from one part to the leading frame F, and to it the lever H may be secured at any desired point by a latch device, or more permanently by a clamping-bolt, as may be desired.

The reel M is constructed in any ordinary way, and its two ends are supported upon arms N N, which are adjustable as to the elevation of their outer ends. The reel is driven from a pulley, O, upon the main pinion-shaft. The main driving-wheel K is mounted upon an axle, which is adjustable up and down in a slotted standard, P. The slot in said standard is curved in the arc of a circle, of which the axis of the pinion-shaft Q is the center, so that however the axle of the wheel K may be raised or lowered in respect to the main frame, the distance of its center from the center of the pinion-shaft will remain unchanged, and the pinion R will always remain in proper mesh with the gear-wheel S, which is attached to the main driver. The pinion R is made to slip upon the pinion-shaft, so as to go out of and into engagement with a clutch-pin, *e*, when it is desired to connect or disconnect the mechanism from its driving-power. The pinion R is moved and maintained in position by the forked shipping-lever $f$, which is provided with a suitable stop, $g$, to hold it in the desired position. The bevel-driver T is secured upon the main pinion-shaft Q, and gears with the crank-shaft pinion U, to drive the cutter's crank V. The cutter's crank-shaft has its bearing in the long box W, located upon the main frame-plate A near its outer side. The main pinion-shaft Q has its bearing at one end in the box Y, which is bolted to the side bar B, and at its other end it has its bearing in the pinion A′, which is made with a long sleeve, a portion of the outer surface of which is made cylindrical, for a journal, and is fitted to the box B′. The end of the shaft Q is fitted to the inner surface of the sleeve A′, and thereby revolves on the same axial line, but within less lineal space than would be required if distinct bearings were provided. This arrangement of shaft and pinion is clearly shown in Fig. 16. The sleeve of the pinion A′ has a flange or solid collar on its inner end, so that it can have no end-play in the box B′, and the stop-screw $h$, stepping into an annular channel in the pinion-shaft Q, prevents any end-play of said shaft. The pinion A′ gears with the internal bevel-wheel C′, which drives the rake. This wheel C′ is of peculiar shape. Its web is concave on its inner side, and is attached to the outer ends of its bevel-gear teeth, so that the shaft of the pinion A enters from the smaller side, and said pinion is inclosed entirely within the cavity of the wheel C′. This is clearly shown in Fig. 14.

The wheel C′ has its axis-pin screwed into a stud, D′, cast solid with the plate A, and said axis is inclined forward from the line of the pinion-shaft Q at an angle of twenty degrees (20°) or thereabout. This angle, however, will depend upon the location of the axis about which the rake moves, as this latter axis must be in line with the axis of the wheel C′.

The rake E′ is mounted upon the post F′, around which it moves as an axis, to sweep the cut grain from the platform, and it is caused to move back and forth over the platform for that purpose by the revolution of the wheel C′ and the peculiar connection, which I will now describe.

The rake-head is pivoted in the yoke G′, which is constructed so as to permit a relative movement of the rake-head and yoke in a vertical plane. The yoke G′ is mounted on a horizontal pivot in a forked stud, H′, the lower end of which descends through the hollow post F′, and is secured by a nut or equivalent means at its lower end.

It will be perceived that the yoke G′ is capable of movements in two planes, viz., in a horizontal plane on the pin which connects it to the stud H′, and in a horizontal plane by movements of said stud in the post F′; and it follows that, if the yoke G′ is connected to the wheel C′ at a point more or less distant from its center, the said yoke and its attachments may be caused to move in a circular path with each revolution of said wheel upon a point or axis coincident with the point of junction of the horizontal and vertical axes of the stud H′ above described. This movement is effected by the arm I′, which projects from the end of the yoke G′, and is provided at its end with a ball, as shown in Fig. 10. This ball is seated in a socket, J′, secured to or formed on the convex side of the wheel C′, and as said wheel revolves said ball and arm are carried around with it, and a movement, as above described, is imparted to the yoke and to the rake E′, which is pivoted to said yoke.

While, however, the arm I′ is moving forward (describing the upper part of its revolution around the center of the wheel C′) the rake E will be moving backward along the surface of the platform to sweep the cut grain therefrom, and while the yoke G′ is moving in a circular path the rake must necessarily move in a plane, and these movements are accommodated by the construction of the yoke G′ with a vertical guide, $r$, which will permit a relative movement of rake and yoke in a vertical direction, as before described. Thus, while the arm I′ is describing the upper part of its circuit, moving toward the front of the machine, the rake E will be moving backward along the surface of the platform, and a relative vertical movement between yoke and rake will also be going on; but when the arm I′ has begun to pass along the lower part of its path, moving toward the rear of the machine, then the rake will be raised up from the platform, and will move forward to the front of the machine again in a corresponding circular path.

The horizontal axis through the yoke and stud H′ is formed of the pin L′, Fig. 11, with a projecting head and flange, around which is coiled a spring, M′, Fig. 13, one end of which is bent around the arm I′, and the other end is passed over the yoke and top of the rake-head E, to act upon the latter in a downward direction and press it constantly toward the platform.

Upon the pinion-shaft Q, adjoining the end of the sleeve of the pinion A′, is a clutch-collar, N′, with clutch-teeth formed on the adjoining portions of said collar and sleeve, and a spring, $t$, placed around the pinion-shaft tends to keep these clutch-teeth always engaged with each other. When they are so engaged the pinion A′ with its connections revolves with the pinion-shaft Q, and the rake is operated. When said clutch-teeth are disengaged, then the rake ceases to operate; and said teeth are so beveled backward that they will slip past each other during a backward movement of the machine, and a reverse movement of the pinion-shaft and rake will not thereby be caused.

An ordinary forked clutch-lever, $k$, serves to move the clutch-collar N′ out of engagement with the clutch-teeth on the pinion-sleeve, and said lever is connected by a cord or chain, $i$, to a treadle, $m$, upon the leading frame F convenient to the foot of the attendant.

When the grain is thin and the quantity cut during one revolution of the rake is insufficient for a gavel, it is desirable that the rake shall be thrown out of gear and stopped until a sufficient quantity of grain has been collected upon the platform; and it is desirable that it should only be thrown out of gear at one point of its circuit. I therefore employ the short lever $n$ and link $o$ to limit the movement of the clutch-collar to such point of the revolution of the wheel C' as shall bring a notch in its periphery opposite the end of the lever $n$. The lever $n$ is pivoted to the cap of the box B', and its free end is located very near to the rim of the wheel C'. The link $o$ connects the opposite end of the lever $n$ with the clutch-lever $k$ at a point between its fulcrum and its forked end.

In view of this arrangement it will appear evident that if the lever $k$ is moved so as to move the clutch-collar N', the free end of the lever $n$ will be brought in contact with the rim of the wheel C', and will thereby terminate said movement of the clutch-collar N' before a disengagement takes place. The wheel C' will, therefore, continue to revolve until the notch $s$ in the periphery of said wheel comes opposite the end of the lever $n$, which may then move into said notch, and thereby permit the disengagement of the clutch. This is clearly shown in Fig. 7, where the rake is represented as out of gear and at rest.

The notch $s$ is so located in reference to the socket J' that the rake will be thrown out of gear only when it has already commenced to rise up.

The center upon which the rake moves (post F) is situated in rear of the finger-bar, and it is therefore necessary to make the rake-head E' with a lateral bend, as shown in Fig. 2, so that the rake-teeth may strike the platform in a line parallel with the finger-bar. The arm I' is also set upon the end of the yoke G', at an angle of forty-five degrees (45°), more or less, according to the required sweep of the rake, dimensions of parts, &c., so that it may meet the socket J', as shown.

By removing the platform, reel, and raking attachments this machine may be readily converted into a mower for cutting grass.

Having described my invention, what I claim as new is—

1. The bevel-wheel C', constructed as described, and combined with the pinion A', in the manner and for the purpose set forth.

2. The pinion A', constructed with a long sleeve, as described, to form a bearing within it for the end of the pinion-shaft Q.

3. The arrangement of the pinion-shaft Q, with its bearing in the sleeve of the pinion A', and the stop-screw $h$ set into an annular channel in said shaft, as described.

4. In combination with the clutch-lever $k$, the lever $n$, link $o$, and notch $s$, in the rim of the wheel C', operating together to prevent the rake from being thrown out of gear except at a certain point of its circuit.

5. The combination of the clutch-collar N', clutch-lever $k$, stop device $n$ $o$ $s$, and pinion A', constructed with a sleeve and clutch-teeth at the end thereof, as described.

6. The yoke G', constructed with the arm I' and guide $r$, in combination with the rake E'.

7. In combination with the yoke G' and rake E', the spring M and pin L', for the purpose set forth.

NICHOLAS ALLSTATTER.

Witnesses:
MICKEL SHELLENBACK,
A. A. MIXER.